June 8, 1954  J. G. DAVIS  2,680,583
TEMPERATURE SENSING ELEMENT
Filed Aug. 1, 1952

INVENTOR.
JOE G. DAVIS
BY  ATTORNEY
Roy Mattern Jr.

Patented June 8, 1954

2,680,583

UNITED STATES PATENT OFFICE 2,680,583

TEMPERATURE SENSING ELEMENT

Joe G. Davis, Seattle, Wash., assignor to Boeing Airplane Company, Seattle, Wash., a corporation of Delaware Application August 1, 1952, Serial No. 302,290

5 Claims. (Cl. 244—134)

This invention relates to temperature sensing equipment primarily suitable for installation in airplanes and more particularly concerns an improvement which aids in ascertaining the temperature of the outer skin of double skins used at critical locations where extreme temperatures are likely to occur.

The invention comprises a lightweight, compact, interchangeable skin temperature sensing element insertable from the outside into a recess in the outer structure of an airplane with means: for interfitting it with both the inner and outer skins, for receiving and directing the circulation of heated or cooled fluid through the element, and for indicating the temperature of the outer portion of the element.

The purpose of the invention is to provide a skin temperature sensing element which reliably indicates the true temperature of its outer portion which is subjected to substantially the same heat transfer conditions as the outer skin surrounding it, thereby accurately indicating the outer skin temperature.

It is an object of the invention to provide a skin temperature sensing element with interchangeable portions that are easily removed directly from the exterior of the airplane for making repairs and adjustments.

It is an object of the invention to provide a skin temperature sensing element removably mounted in a double skin structure flush with the outer skin.

It is an object of the invention to provide a skin temperature sensing element adapted to the installation of varied pickup means such as thermocouples, resistance coils, thermal switches and other similar applications.

The purpose and objects of this invention will be more clearly understood from the following description of a preferred embodiment written with reference to the drawings wherein the same parts are noted throughout the views by like numerals. In the drawings.

Figure 2:
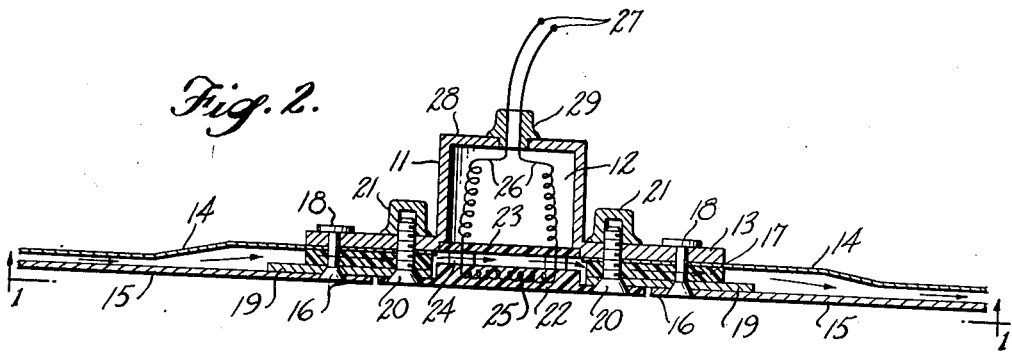
Figure 2 is a sectional view of Figure 1 on line 2—2.
Figure 1:
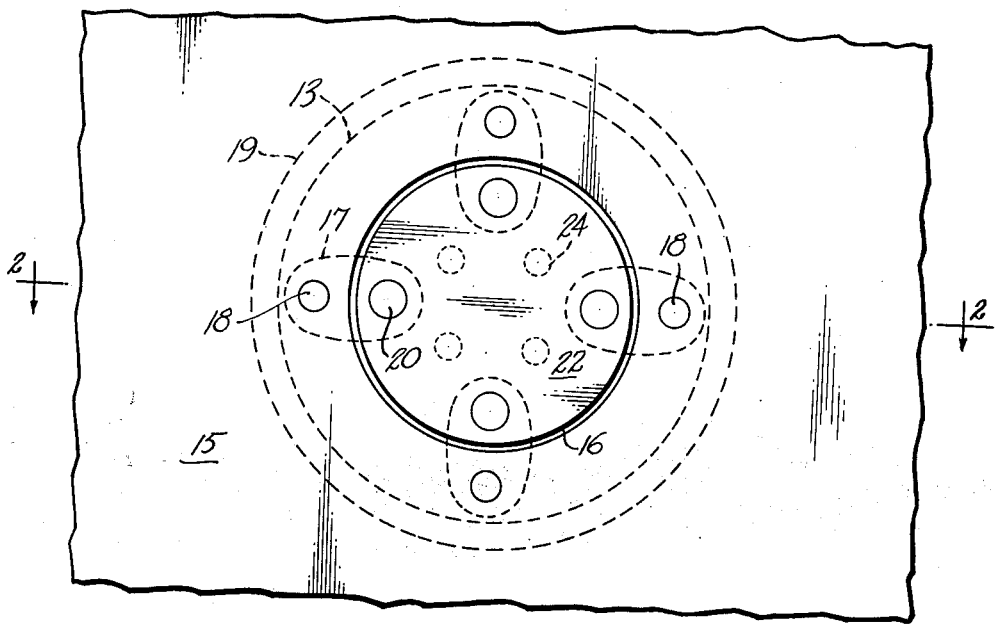
Figure 1 is an outside view of the skin temperature sensing element installed in an airplane (view of Figure 2 on line 1—1).

The invention as used in airplanes is designed to be one of several units installed at critical locations to initiate electrical signals that are employed advantageously in conjunction with skin temperature indicating devices (not shown), skin temperature control systems (not shown) and other similar equipment (not shown).

The skin temperature control system, for example, is designed to maintain the skin temperature at a pre-selected value throughout portions of the airplane which may be subjected to extreme temperatures resulting either in over-heating or icing. In this system, the signals created in the skin temperature sensing element are amplified and regulated to control relays governing the actuation of temperature control valves. The valves in turn regulate the flow of heated or cooled fluid to the spaces defined by the double skin construction to offset the effects of the extreme temperatures.

Whenever the skin temperature sensing element therefore is incorporated into control or indicating equipment, it is necessary that the sensing element promptly and accurately ascertain increments of temperature change of the outer skin. The design of this sensing element insures that it will perform this important function.

More particularly, the invention comprises a receptacle 11 having a chamber 12 integrally formed with a flange 13. It is attached to the double skins 14 (inner) and 15 (outer) at a typical location 16 where spacers 17 are inserted between the skins 14 and 15 around aligned cutouts in the skins. The fasteners 18 pass through and hold together the outer skin 15, a reinforcement 19, the spacers 17, the inner skin 14 and the flange 13.

This mounting of the receptacle provides a recessed chamber in the double skin structure into which the remaining readily removable portions of the invention are partially inserted and retained by screws 20. The screws 20 pass through the removable portions and all the more permanently fastened portions of the sensing element and into the nuts 21.

This removable portion is an integral structure of two spaced segments preferably in the form of wafers or discs, the outer 22 and the inner 23. The discs are spaced apart by removing material leaving the spacers 24 which also encircle signal wires, as will be noted later. The open volume remaining is comparable to the volume of any selected similarly sized portion of the double skin construction. This design insures that the cooling or heating air will flow through the sensing element under conditions closely approximating the flow throughout the double skins thereby obtaining heat transfer conditions substantially identical with those affecting the temperature of the outer skin 15.

The outer wafer or disc 22, therefore, becomes the reliable source of obtaining indications of changes in outer skin temperature. Within the disc 22, a means is installed to initiate signals that will indicate the increments of temperature change. The means can be similar to a thermal switch (not shown), a thermocouple (not shown) or a resistance wire 25 in disk 22, having coiled leads 26 extending through the spacers 24 and disk 23 of the sensing element into the receptacle 11.

Although duplication of the heat transfer conditions by similar spacing of the disks with the skins provides the most accurate means of sensing the outer skin temperature, a varied spacing may be desirable. For example, a smaller or larger gap will establish the required differential in the temperatures between the sensing element and the outer skin that may be employed in a control system which is designed to either anticipate or lag behind the changes in the outer skin temperature.

Apart from the operational aspects, the design of the sensing element is directed toward the ease of maintenance and repair. As noted previously it is installed from the exterior of the airplane. Once installed, it can be periodically inspected or repaired without severing the leads 26 from the circuit leads 27 which are joined together at the inserted end 28 of the receptacle 11. This is made possible by providing leads 26 with a sufficient number of freely expandable coils located within the interior of the receptacle 11.

The circuit wires 27 emerge from the receptacle 11 at the terminal 29 to transmit the signals initiated in the skin temperature sensing element to the analytical electrical apparatus (not shown) employed in conjunction with some or all of the skin temperature indicating devices (not shown), the skin temperature control systems (not shown) and other similar equipment (not shown).

The invention has been shown and described with reference to its direct application in airplane equipment, however, it is adaptable to any equipment designed to ascertain the temperature or changes in temperature of one or more materials separating fluids.

Having now particularly described and ascertained the nature of my invention and in what manner the same is to be performed, I declare that what I claim is:

1. A lightweight, compact, interchangeable skin temperature sensing element removably installed from the outside into cut-outs in the double skin of an airplane comprising a receptacle secured to the structure, a removable, partial-insert fastened to the said receptacle consisting of an outer segment continuous with the outer skin and an inner segment continuous with the inner skin, spacers between the segments, an electro-thermo pickup means contained within the said outer segment, and electrical connections between the pickup means and an analytical electrical system to carry the signals initiated within the outer segment which is subjected to the heat transfers that vary the outer skin temperatures, thereby creating signals that accurately reflect the outer skin temperature.

2. A skin temperature sensing element removably installed within the double skin of an airplane to initiate electrical signals which are transmitted to the controls of a thermal anti-icing system, comprising a receptacle secured to the wing structure within aligned cut-outs of the inner and outer skins, a partial-insert removably fastened to the receptacle at its open end consisting of spaced integral disks, each completing the continuity of the respective inner and outer skins thereby establishing a passage between the spaced disks comparable to the passage between the skins so the heat transfer conditions are substantially the same and an electric-thermo means extending throughout the said outer disk to initiate signals utilized in the control circuits of the thermal anti-icing system.

3. A temperature sensing element removably installed between spaced, adjacent partitions one of which is subjected to changing temperatures on its respective sides, comprising a receptacle secured to the partitions, a partial-insert removably fastened to the receptacle consisting of spaced segments each complementally fitted to a cutout in a respective partition, spacers separating the segments and an electrical pickup means within that segment which is fitted to the partition subjected to the changing temperatures, and a means to connect the electrical pickup means to an analytical electrical system which indicates the temperature of the partition and actuates controls governing the flow of fluid between the partitions to regulate the temperature of the partition.

4. A temperature sensing element for initiating electrical signals used in an analytical electric system that serves as a temperature indicating and control mechanism, comprising a receptacle, a partial-insert consisting of spaced segments fastened to the said receptacle with portions projecting clear of the receptacle to interfit with the structure of an encompassing walled passage, an electrical pickup means within a spaced segment to initiate signals that are transmitted to analytical electrical devices which in turn indicate changes in the wall temperatures and control the operation of valves regulating the flow of fluid through the passage.

5. A temperature sensing element insertable in a passageway comprising spaced segments that are subjected to the same fluid flows as the passageway, spacers interconnecting the segments, mounting means for attachment of the segments to the passageway structure and electrical pickup means in a segment to initiate signals utilized in an analytical electrical system which indicates changes in the passage wall temperature and controls the operation of valves regulating the flow of fluid through the passage.

References Cited in the file of this patent

UNITED STATES PATENTS

| Number | Name | Date |
|---|---|---|
| 2,282,441 | Whitlock | May 12, 1942 |
| 2,463,984 | Lederer | Mar. 8, 1949 |
| 2,478,878 | Smith | Aug. 9, 1949 |
| 2,582,232 | Cesaro | Jan. 15, 1952 |